United States Patent [19]

Miyake et al.

[11] Patent Number: 4,921,202

[45] Date of Patent: May 1, 1990

[54] VERTICAL VIBRATION-DAMPING APPARATUS

[75] Inventors: Hiraku Miyake; Mitsuo Ishiguro; Yutaka Hayamizu; Satoru Aizawa, all of Tokyo, Japan

[73] Assignee: Takenaka Corporation, Osaka, Japan

[21] Appl. No.: 283,810

[22] Filed: Dec. 13, 1988

[30] Foreign Application Priority Data

Jan. 6, 1988 [JP] Japan .................... 63-821

[51] Int. Cl.⁵ .................................. F16M 13/00
[52] U.S. Cl. .................. 248/581; 108/136; 248/589; 248/610
[58] Field of Search ............ 248/581, 610, 589, 364, 248/123.1; 108/136, 144, 147

[56] References Cited

U.S. PATENT DOCUMENTS

| | | | |
|---|---|---|---|
| 2,560,928 | 7/1951 | Bockius | 108/136 |
| 2,604,996 | 7/1952 | Smith | 108/147 X |
| 2,802,575 | 8/1957 | Harrison | 108/136 X |
| 3,236,412 | 2/1966 | Vaught et al. | 108/136 |
| 3,283,731 | 11/1966 | Maslow | 108/136 |
| 3,381,634 | 5/1968 | Rothschild | 108/136 |
| 3,606,021 | 9/1971 | Roels | 108/136 |
| 3,820,176 | 6/1974 | Feiertag | 108/147 X |
| 4,130,069 | 12/1978 | Evans et al. | 108/144 X |

FOREIGN PATENT DOCUMENTS

| | | | |
|---|---|---|---|
| 629322 | 3/1963 | Belgium | 248/610 |
| 652807 | 2/1963 | Italy | 248/123.1 |
| 62-86265 | 4/1987 | Japan | |

Primary Examiner—David L. Talbott
Attorney, Agent, or Firm—Ronald P. Kananen

[57] ABSTRACT

A vibration-damping floor is supported by one ends of flexible coupling members, such as chains or ropes whose the other ends are connected through guide sprockets and movable spring frames to tension springs set horizontally under the floor. A vertical vibration for the floor is absorbed by the springs.

8 Claims, 5 Drawing Sheets

FIG. 4
FIG. 5
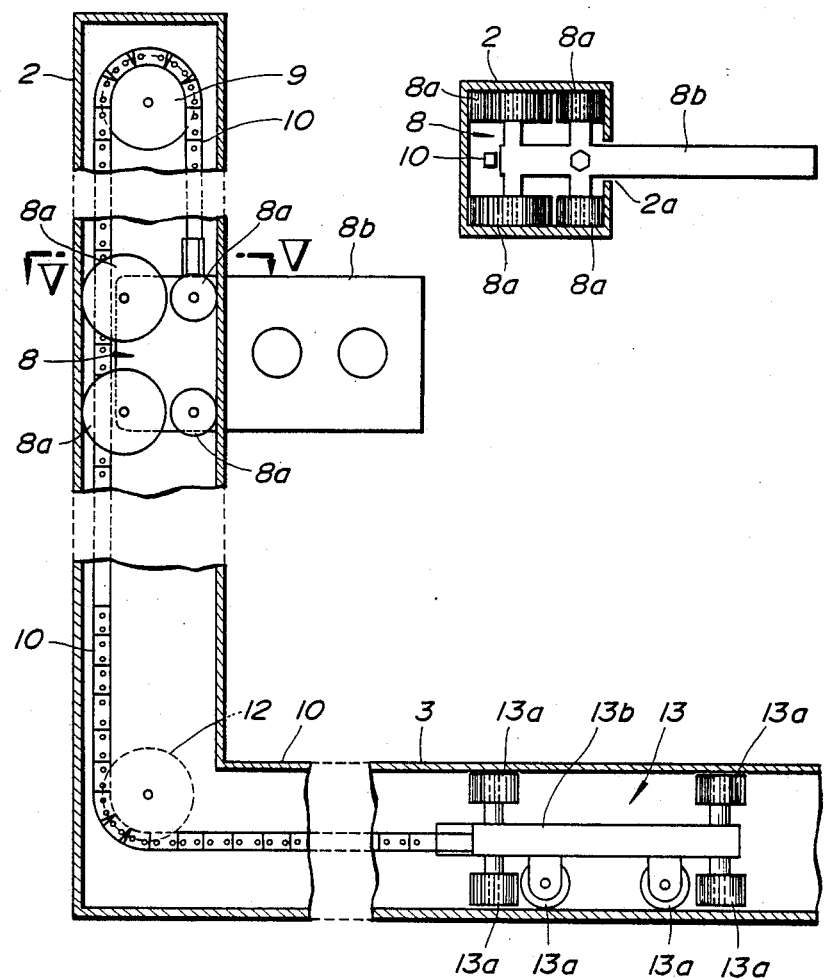
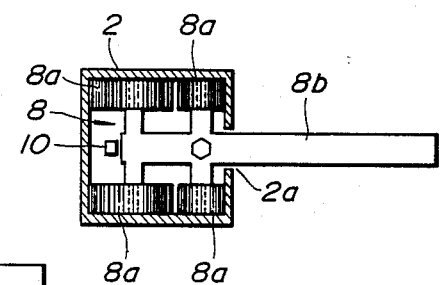

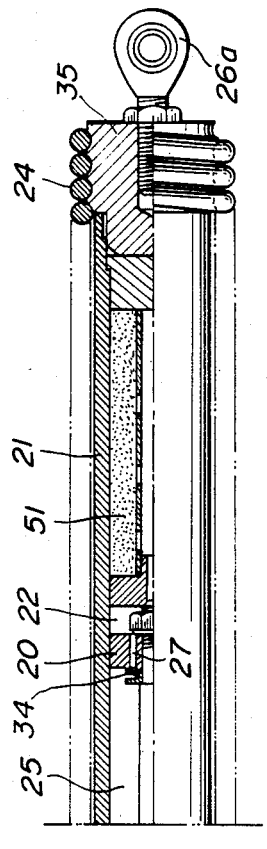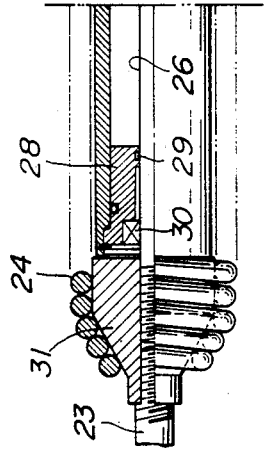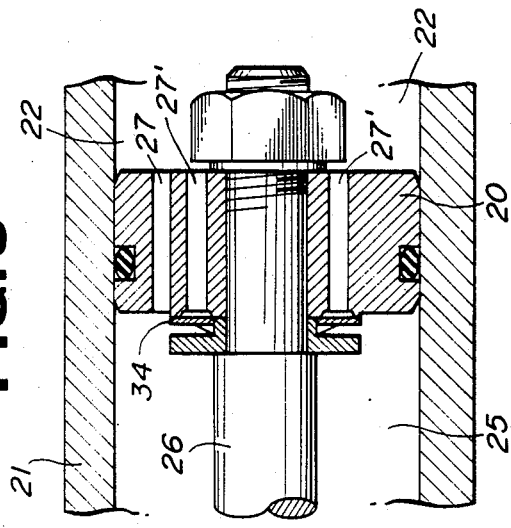

VERTICAL VIBRATION-DAMPING APPARATUS

BACKGROUND OF THE INVENTION

The present invention relates to a vertical vibration-damping apparatus which is set mainly on floors of a building for protecting vibration sensitive office automation equipment or the like from vertical vibrations based on a vertical type earthquake, various construction works, road traffic, etc.

With the recent spread of office automation equipment, vibration-damping constructions of buildings and vibration-damping floors have been developed increasingly so as to protect the vibration sensitive equipment from being damaged by earthquake or the like. Some such constructions and floors have been realized (refer to, for example, U.S. patent Ser. No. 99,326 corresponding to Japanese Published Unexamined Patent Application Nos. 62-86265 and 62-86266).

However, all the conventional vibration-damping apparatuses are constructed to be effective against horizontal vibrations. There is no developed damping apparatus for the vertical vibrations.

Until now, vibration-damping means has been proposed to protect the office automation equipment from being damaged by the vertical vibrations. It is a problem maintaining this office automation equipment.

It may be considered as a primary construction theory of the vertical vibration-damping apparatus to provide coil springs vertically under the vibration-damping floors, on which the office automation equipment is provided, so that the former supports elastically the latter. However, such a construction requires that the length of each coil spring is the sum of a basic spring length and a vertical vibration stroke length for insuring to damp the vibration by this stroke length. If the vibration-damping apparatus employs such long springs vertically, the position of the vibration-damping floor may be high, and the high position floor is not comfortable to use. An index to the solution of this problem is apt to limit the stroke of the vertical vibrations, and thereby the vibration-damping is not effective to the long period vibrations.

In addition, if the coil springs are used vertically, locking may occur. This is another problem.

SUMMARY OF THE INVENTION

In order to solve the problems of the above-discussed prior arts, a vertical vibration-damping apparatus is constructed as shown in preferred embodiments of the attached drawings as follows:

(a) A base member includes midair guide props provided perpendicularly at four corners of the base member and midair lateral guide frames each connected with lower end portions of the two opposite guide props.

(b) Two movable spring frames are provided between the two lateral guide frames which are provided horizontally in parallel and face each other. The spring frames are movable horizontally along the lateral guide frames. A desired number of tension springs are coupled in parallel between the two movable spring frames, wherein the length and strength of the tension springs are equal to each other.

(c) A vibration-damping floor is set horizontally at a relatively higher position of a space surrounded by the guide props at the four corner positions, and this floor is supported by roller units which are free to move vertically along each guide prop. Each roller unit is connected at one end of a flexible coupling member, such as a chain or a rope which is wound round a guide wheel at the upper end of the guide prop and takes a U-turn downward. The other end of each coupling member is extended through the midair portions of the guide prop and the lateral guide frame and connected to the corresponding movable spring frame.

According to the vertical vibration-damping apparatus, dampers cooperating with the movable spring frames are set in the direction of movement of the movable spring frames at positions such that the movable spring frames move a predetermined value.

First ends of the movable spring frames are connected to roller unit frames of second roller units which are movably set in the midair portions of the lateral guide frames horizontally facing each other. The movable spring frames are set to move horizontally along the lateral guide frames.

In addition, each roller unit includes a plurality of rotary rollers which run along the opposite inner surfaces of the midair portion of the guide prop or the lateral guide frame. A roller unit frame for each roller unit projects through a slit formed longitudinally at a side wall of the guide prop or the lateral guide frame.

Objects and advantages of the present invention will become apparent to those having ordinary skill in the art when taken in conjunction with the accompanying drawings.

DRAWINGS

FIG. 4 is a magnified cross sectional view of a guide prop and a lateral guide frame portion;

FIG. 5 is a cross sectional view along a line V—V of FIG. 4;

FIG. 8 is a cross sectional view of a combination of the spring and a damper; and FIG. 9 is a magnified view of a piston portion.

DETAILED DESCRIPTION OF THE INVENTION

Figure 1:
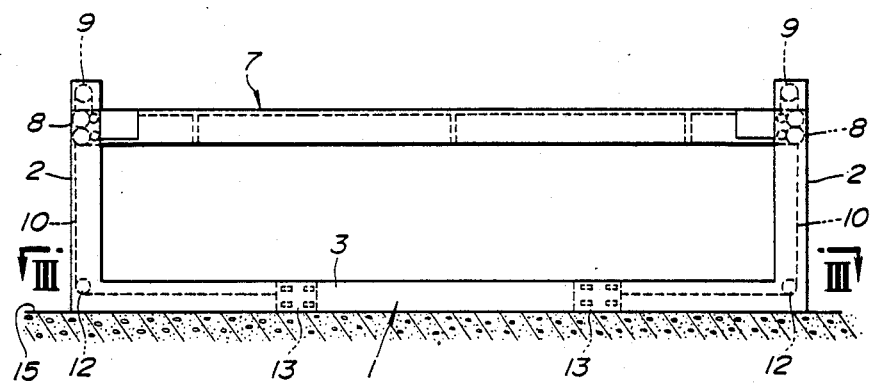
FIG. 1 is a front view of a vertical vibration-damping apparatus according to this invention.

Referring to the drawings, when a floor 15 of a building supporting a base member 1 vibrates vertically in response to a vertical earthquake, the base member 1 and the floor 15 vibrate vertically, but a vibration-damping floor 7, supported by springs 5 on the base member 1, and office automation equipment set on the floor 7 maintain a standstill condition because of a standing inertia. When the base member 1 (and guide props 2 and guide wheels 9 thereof) moves upward while keeping the vibration-damping floor 7 at the standstill position, a relative position change of the floor 7 and the base member 1 may cause flexible coupling members 10 to be pulled toward the movable floor 7 (or roller units 8) in FIG. 4. This movement of the coupling members 10 may make two movable spring frames 4 separate equally from each other by moving horizontally toward both outsides. Thus, tension springs 5 connected between both the movable spring frames 4 may be extended to absorb the vibration and accomplish a long period of the vibration. Within this limitation, a flexible restriction relationship between the base member 1 and the vibration-damping floor 7 may be maintained.

When the movable spring frames 4 reach a coupling position with a damper 6 and further move over the position, the damper 6 starts to operate (or is extended). An attenuation power based on the extension of the damper 6 is added to the resistance of the springs 5 so as to prevent an excessive displacement of the springs 5.

As increasing the length of the lateral guide frame 3 of the base member 1, the length of the spring 5 and the movement stroke of the movable spring frame 4 may be long and thereby preventing to set the floor at the high position.

All the length of the guide props can be contributed to the vertically relative displacement of the base member 1 and the vibration-damping floor 7.

If the vibration of the base member 1 reaches the upper limit position and changes downward, the relative displacement between the base member 1 and the vibration-damping floor 7 may occur, wherein the floor 7 is apt to maintain the standstill condition because of the standstill inertia. As a result, the coupling members 10 are apt to loosen between the vibration-damping floor 7 and the guide sprocket 9. However, the looseness of the coupling members 10 may be completely absorbed by a tension effect of the springs 5 which are already extended. Thus, the flexible restriction relationship between the base member 1 and the vibration-damping floor 7 may be maintained very well. The vibration of the floor 7 may be absorbed, the period of the vibration may be long, and thereby the vibration-damping effect may be obtained. Therefore, the office automation equipment mounted on the vibration-damping floor 7 may be protected from the vertical vibration based on the earthquake or the like.

In the normal condition, the movable spring frames 4 are stable at a position (neutral position) on which the pulling power of the springs 5 and the weight of the vibration-damping floor 7 are balanced.

Preferred embodiments of the present invention will be further discussed in detail.

Figure 2:
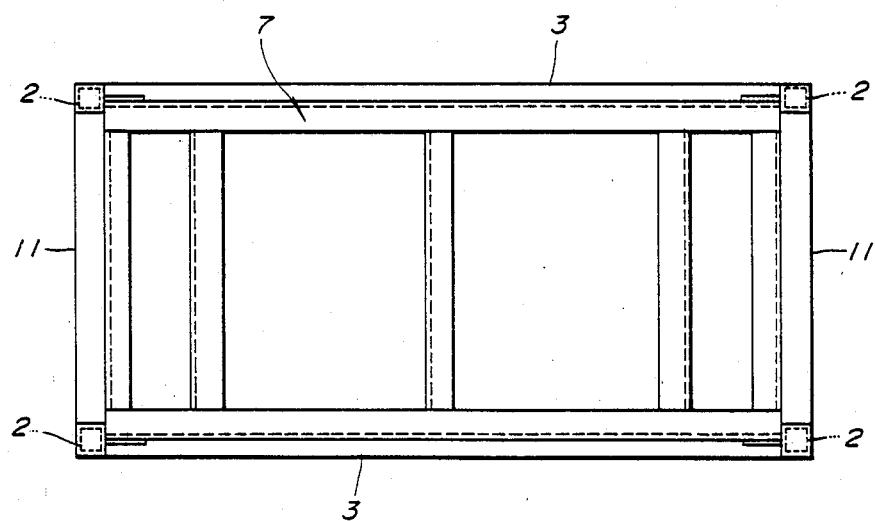
FIG. 2 is a plan view of FIG. 1.

As shown in FIGS. 1 and 2, the base member 1 is similar to a reversed table having four legs. A plan shape thereof is a rectangle, and midair guide props 2 consisting of square pipes are provided perpendicularly at four corners of the rectangle. The midair lateral guide frames 3 consisting of square pipes are fixedly connected to the lower end portions of the two guide props 2 facing each other in the longitudinal direction. The midair portions of the guide props 2 are coupled to the midair portions of the lateral guide frames 3 (see FIG. 4). Joint members 11 are fixedly connected to the lower end portions of the two guide props 2 facing each other in the lateral direction. Thus, the base member 1 of the hard construction is completed. The size of the base member 1 is, for example, as follows: The length and width of the plan shape are 600×1200 mm, and the height of the guide prop 2 is 400 mm.

The vibration floor 7 is set at a relatively higher position of the space surrounded by the guide props 2 at the four corners of the base member 1, and it can move vertically while maintaining its horizontal position. As shown in FIGS. 4 and 5 is detail, the roller unit 8 is provided in the midair portion of the guide prop 2 of the square pipe construction, and this roller unit 8 runs along the two wall surfaces facing each other in the midair portion. The rotation rollers 8a are provided at the upper left, upper right, lower left and lower right positions in the midair portion of both sides of the roller unit 8, and the total number of the rollers is eight for every roller unit. A roller unit frame 8b extends to the outside of the guide prop through a vertical slit 2a (FIG. 5) formed at the wall of the guide prop 2. The four corner positions of the vibration-damping floor 7 are fixedly connected to the four roller unit frames 8b projected from the guide props 2 so as to support the floor 7. Since the roller units 8 run vertically along the inner surfaces of the midair portions of the guide props 2, the vibration-damping floor 7 may move vertically while maintaining the horizontal condition.

As shown in FIG. 4, in each guide prop 2, the unit frame 8b of the roller unit 8 is connected to one end of the flexible coupling member or chain 10 which takes a U-turn at the guide sprocket 9 provided at the upper portion of the guide prop 2. The other end of the chain 10 extends downward in the midair portion of the guide prop 2 and reaches the guide sprocket 12 provided at the lower end of the guide prop 2. The chain 10 further extends through the midair portion of the lateral guide frame 2, and the end of the chain 10 is connected to the roller unit 13 of the movable spring frame 4.

The two movable spring frames 4 are provided between the two lateral guide frames 3 of the base member 1, and these frames 4 are movable in parallel and in a lateral direction. The roller units 13 are provided in the midair portions of the lateral guide frames 3 and run along the two parallel opposite inner wall surfaces of each midair portion. Each roller unit 13 includes six rotatable rollers at the upper right, upper left, lower right and lower left portions and two lower portions. The roller unit frame 13b extends to the inside through a long slit formed longitudinally at the inside wall of the lateral guide frame 3. Thus, the pair of roller unit frames 13b facing each other are fixed to the movable spring frame 4. As discussed hereinbefore, the end of the chain 10 passes through the midair portion of the lateral guide frame 3 and connects to the roller unit frame 13b, so that the vibration-damping floor 7 and the spring frames 4 cooperate with the chains 10. Since the roller units 13 run in the lateral direction along the inner surfaces of the midair portions of the lateral guide frames 3, the movable spring frames 4 can move horizontally in the lateral direction.

Both ends of many tension coil springs 5 are connected between the two movable spring frames 4, wherein the length and the strength of the springs are equal to each other. The spring constant and number of the coil springs 5 may be adjusted in accordance with the response acceleration speed.

Figure 6:
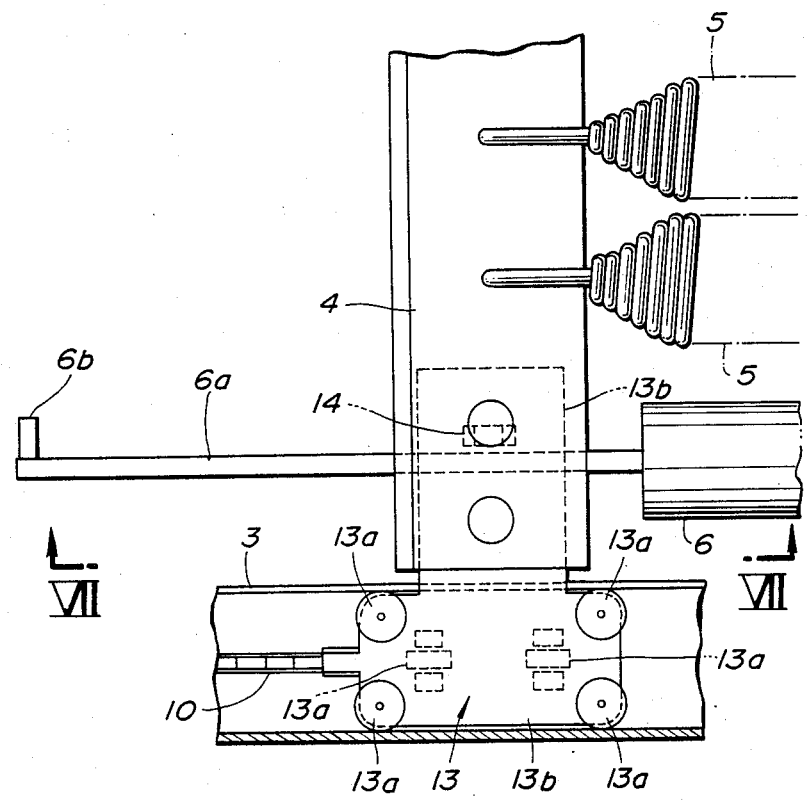
FIG. 6 is a magnified view of a movable spring frame and spring portions.
Figure 7:
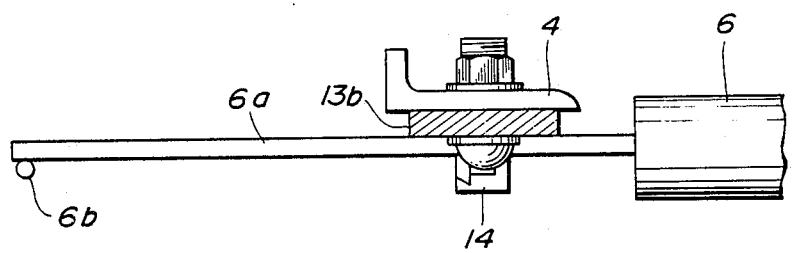
FIG. 7 is a cross sectional view along a line VII—VII of FIG. 6.

Four oil dampers 6 are fixed to the lateral guide frames 3 of the base member 1 at positions inside neutral stop positions of the two movable spring frames 4, wherein the oil dampers are positioned along the lateral guide frames 3 and parallel with them, and they face the outside. A shaft 6a of each oil damper 6 extends over the movable spring frame 4 at the neutral position, and a coupling pin 6b is provided perpendicular at the end portion of the shaft (see FIGS. 6 and 7), in which the pin 6b faces horizontally the inside. Each pawl 14 projects downward from the lower surface of the movable spring frame 4 so as to couple with the coupling pin 6b. After each pawl is coupled with the pin, each the oil damper 6 may be extended as the movable spring frame 4 moves. The well known standing inertia keeps the standing position of the vibration-damping floor 7 and the office automation equipment provided on it. However, when the relative displacement between the building floor 15 and the vibration-damping floor 7 occurs in response to the vertical vibration of the building floor 15 and the base member 1 (and the guide props 2 thereof), the vibration-damping floor 7 pulls the chains 10 so that the two spring frames 4 separate to the outside. Thus, the tension coil springs 5 between the two movable spring frames 4 are pulled and extended. In this operation, if each pawl 14 catches the latch pin 6b of the shaft 6a of the oil damper 6 on the way of the movement stroke of the movable spring frame 4, the oil damper 6 may cooperate with the movable spring frame 4 from this point. Thus, the pulling resistance of the spring and the attenuation power of the oil damper are summed so as to effectively prevent the tension displacement of the spring 5 from increasing excessively.

When the vibration applied to the base member 1 changes from the upper limit position to the downward direction, the vibration-damping floor 7 is apt to maintain the standstill condition because of standing inertia, but the relative displacement may occur between the vibration-damping floor 7 and the base member 1. As a result, the chains 7 are apt to be loosened, but this looseness is prevented by the strong contraction effect of the springs 5, which are already expanded. Thus, the flexible restriction relationship between the base member 1 and the vibration-damping floor 7 may be maintained very well.

It may be proper to set the vertical vibration-damping apparatus on a floor of a conventional horizontal vibration-damping apparatus instead of the building floor 15. In this instance, the office automation equipment or the like on the vibration-damping floor 7 can be protected effectively from the vertical and horizontal vibrations based on the earthquake or the like.

In the above-discussed first embodiment, the springs 5 coupling between the two movable spring frames 4 and the dampers 6 fixed on the lateral guide frames 3 are constructed independently. However, the second embodiment uses a spring damper mechanism combining both the spring and the damper as shown in FIGS. 8 and 9. In this second embodiment, a piston 20 is slidably provided in a cylinder 21 which receives viscous fluid, such as oil, and a piston rod 26 extends through oil seals 29 and 30 and is screwed to couple with a cone shaped spindle joint 31. For example, an external diameter of the cylinder 21 is $\phi 30$, and an effective stroke of the piston 20 is 250 mm. A damper rod 23 is screwed to couple with the spindle joint 31 in alignment with the piston rod 26.

The piston 20 includes some orifices 27 and 27' which connect a front chamber 22 and a back chamber 25. As shown in FIG. 9, reverse protection valves 34 are provided so that they are opened by the fluid flowing toward the back chamber 25 of the piston 20. The size of each valve is to cover the opening of each the orifice 27' provided around the center of the piston 20. In other words, when the piston 20 moves to the right of FIG. 9, i.e., when the spring damper mechanism is contracted, the reverse protection valves 34 are opened by the fluid flow so that all the orifices 27 and 27' are opened. Thus, the cross sectional size of all the passages of the orifice 27 and 27' are the maximum, the flowing resistance for the fluid is remarkably reduced (the minimum throttle effect), and the piston 20 can be moved lightly with low resistance. In other words, the contraction operation of the spring damper mechanism is smooth and rapid, and there is no problem of the buckling of the piston rod 26. Even if the recovery power of the tension spring 24 is not so strong, it does not affect the recovery operation of the floor construction and is proper to increase the vibration period.

On the other hand, when the piston 20 backs to the left of FIG. 9, i.e., when the spring damper mechanism is expanded, many orifices 27' are covered with the reverse protection valves 34, and the other few orifices 27 apply large resistance to the fluid flow (throttle effect) so as to produce attenuation power.

Figure 3:
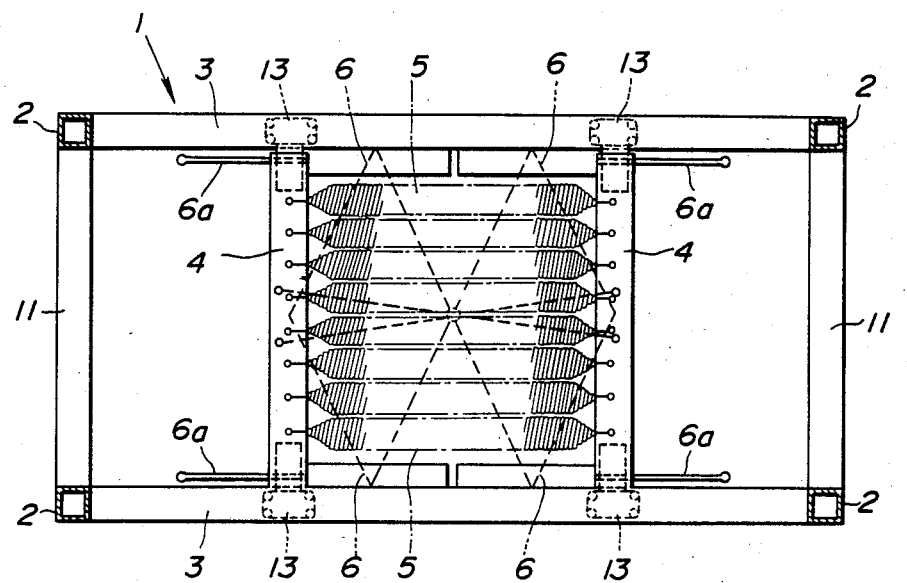
FIG. 3 is a cross sectional view along a line III—III of FIG. 1.

In FIG. 8, the left end of the tension coil spring 24 is fixed by winding on the outside of the cone shaped spindle joint 31, and the other portion of the coil spring 24 is loosely wound on the outside of the cylinder 21. The right end of the spring 24 is fixed by winding on the outside of the cylinder head 35. For example, a line diameter of the tension coil spring 24 is $\phi 8$, a winding number is 58, and the maximum load is 129 Kg. The damper rod 23 and a ring bolt 35a of the cylinder head 35 are connected to the two movable spring frame 4 as shown in FIG. 3.

If the movable spring frame 4 pulls the damper rod 23, the spindle joint 31 and the damper rod 23 move toward the left of FIG. 8 and the tension coil spring 24 is extended. Thus, since both the piston rod 26 and the piston 20 move toward the left, the attenuation power is applied to the movement of the movable spring frame 4. The recovery power of the movable spring frame 4 is produced by applying the tension power stored in the tension coil spring 24 to the damper rod 23 through the spindle joint 31.

As described hereinbefore by reference to the embodiments, the vertical vibration-damping apparatus according to this invention makes a flexible relationship between the base member 1 and the vibration-damping floor 7 by the springs 5 which are contracted and extended horizontally, wherein the base member 1 directly receives the vertical vibration, such as the earthquake from the building floor. Thus, it is possible for the vibration-damping floor 7 to maintain a standing condition with respect to the vertical vibration in accordance with standing inertia. The relative displacement between the base member 1 and vibration-damping floor 7 is converted into the horizontal vibration of the two movable spring frames 4 and the springs 5 connected therebetween. Since the springs 5 contracting and extending horizontally make the period of the vibration long so as to accomplish the vibration-damping effect, the vertical vibration-damping apparatus is compact in construction, can avoid a high floor construction and is easy to use.

Moreover, it is easy to design and manufacture the vibration-damping apparatus such that the expansion and contraction stroke and the length of the springs 5 can be very long horizontally. Thus, the invention can provide the vibration-damping apparatus having a long vibration period and a good vibration-damping effect.

In addition, the vertical vibration-damping apparatus can provide the vibration-damping effect without locking, because the springs 5 are provided horizontally and pulled by the two movable spring frames 4.

While the preferred embodiments of the invention have been shown and described herein, it will be apparent to those skilled in the art that many changes and modifications may be made without departing from the invention in its broader aspects. Therefore, the scope of the present invention should be determined only by the following claims.

I claim:

1. A vertical vibration-damping apparatus characterized in that
   (a) a base member includes midair guide props provided perpendicularly at four corners of the base member and midair lateral guide frames each connected with lower end portions of said two opposite guide props;
   (b) two movable spring frames are provided between said two lateral guide frames which are provided horizontally in parallel and face each other, said spring frames are movable horizontally along said lateral guide frames, a desired number of tension springs are coupled in parallel between said two movable spring frames, the length and strength of said tension springs are equal to each other;
   (c) a vibration-damping floor is set horizontally at a relatively higher position of a space surrounded by said guide props at said four corner positions, and said floor is supported by roller units which are free to move vertically along each said guide prop, each said roller unit is connected to one end of a flexible coupling member, such as a chain or a rope which is wound round a guide wheel at said upper end of said guide prop and takes a U-turn downward, the other end of each said coupling member is extended through said midair portions of said guide prop and said lateral guide frame and connected to said corresponding movable spring frame; and
   (d) means cooperating with said movable spring frames for damping the horizontal movement of said movable spring frames to limit the tension displacement of the springs.

2. A vertical vibration-damping apparatus according to claim 1, wherein at least one ends of said movable spring frames are connected to roller unit frames of roller units which are movably set in said midair portions of said lateral guide frames facing horizontally each other, and said movable spring frames are set to move horizontally along said lateral guide frames.

3. A vertical vibration-damping apparatus according to claim 1, wherein each said roller unit includes a plurality of rotary rollers which run along said opposite inner surfaces of said midair portion of said guide prop or said lateral guide frame, and a roller unit frame for each said roller unit projects through a slit formed longitudinally at a side wall of said guide prop or said lateral guide frame.

4. Apparatus for damping vertical vibrations comprising:
   a base member;
   a plurality of vertical guide members having lower end portions secured to said base member, a space being defined among said vertical guide members;
   two parallel horizontal guide members spaced from one another, each horizontal guide member extending between the lower end portions of two of said vertical guide members;
   two spring frames positioned between said horizontal guide members;
   means for supporting said spring frames for horizontal movement along said horizontal guide members;
   a plurality of tension springs connected in parallel between said spring frames;
   a horizontal vibration-damping floor positioned in the space defined among said vertical guide members; and
   means for supporting said floor for vertical movement relative to said base member, said floor supporting means comprising units mounted for vertical movement along said vertical guide members, a flexible coupling member connected between each unit and one of said spring frames, and guide wheels engaging the flexible coupling members between the units and the spring frames.

5. The apparatus according to claim 4, wherein said horizontal vibration-damping floor is positioned at a higher level than said base member, said units have rollers engaging said vertical guide members, at least some of said guide wheels are rotatably mounted at upper ends of said vertical guide members, and each said flexible coupling member extends from one of said spring frames and around one of the guide wheels mounted at the upper end of a vertical guide member to one of said units, and said horizontal vibration-damping floor is positioned between the guide wheels mounted at the upper ends of the vertical guide members and said base member.

6. The apparatus according to claim 4, further comprising means cooperating with said spring frames for damping the movement of said movable spring frames.

7. The apparatus according to claim 4, wherein each said horizontal guide member comprises a tubular member having a longitudinal slot, the slots of said guide members facing one another, and said means for supporting said spring frames comprises roller units movable in said horizontal guide members.

8. The apparatus according to claim 4, wherein each said vertical guide member is a tubular member having a slot facing said horizontal vibration-damping floor, and each said roller unit includes a roller unit frame connected to said floor, said roller unit frame projecting through the slot of its associated vertical guide member.

* * * * *